(12) United States Patent
Barber (10) Patent No.: US 10,742,561 B2
(45) Date of Patent: Aug. 11, 2020

(54) PREVENTION OF NETWORK RETRANSMISSION TIMEOUT

(71) Applicant: CISCO TECHNOLOGY, INC., San Jose, CA (US)

(72) Inventor: Simon Barber, San Francisco, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 24 days.

(21) Appl. No.: 15/471,807

(22) Filed: Mar. 28, 2017

(65) Prior Publication Data

US 2018/0287952 A1    Oct. 4, 2018

(51) Int. Cl.
| | |
|---|---|
| *H04L 12/855* | (2013.01) |
| *H04L 12/26* | (2006.01) |
| *H04L 12/857* | (2013.01) |
| *H04W 28/02* | (2009.01) |
| *H04L 12/841* | (2013.01) |

(52) U.S. Cl.
CPC ...... *H04L 47/2466* (2013.01); *H04L 43/0864* (2013.01); *H04L 47/2491* (2013.01); *H04L 47/283* (2013.01); *H04W 28/0278* (2013.01)

(58) Field of Classification Search
CPC ............. H04L 47/2466; H04L 47/2491; H04L 47/283; H04L 43/0858; H04W 28/0278
See application file for complete search history.

(56) References Cited

U.S. PATENT DOCUMENTS

| | | | |
|---|---|---|---|
| 2008/0045263 A1 | 2/2008 | Speight | |
| 2015/0263959 A1* | 9/2015 | Patwardhan | H04L 47/193 370/235 |
| 2016/0182388 A1* | 6/2016 | Tsuruoka | H04L 47/283 370/315 |
| 2017/0117999 A1* | 4/2017 | Weston | H04L 5/0055 |
| 2017/0126575 A1* | 5/2017 | Han | H04L 47/283 |
| 2017/0331715 A1* | 11/2017 | Jung | H04L 43/0858 |

* cited by examiner

*Primary Examiner* — Feben Haile
(74) *Attorney, Agent, or Firm* — Polsinelli PC

(57) ABSTRACT

The disclosed technology addresses the need in the art for a solution configured to prevent network retransmission timeouts. A system is configured to receive a data packet originating from a sender and forward the data packet to a receiver. The system receives, from the receiver, an acknowledgment message that corresponds to the data packet and holds the acknowledgment message in a buffer until a delay time period expires, wherein the delay time period is determined based on a log of acknowledgment times. When the delay time period expires, the system forwards the acknowledgement to the sender.

20 Claims, 5 Drawing Sheets

PREVENTION OF NETWORK RETRANSMISSION TIMEOUT

TECHNICAL FIELD

The present disclosure relates to network communications and, more specifically, to preventing a network timeout.

BACKGROUND

Packet-switched networks operate by segmenting data into packets and transmitting these packets across one or more networks to a destination. Certain network transmission protocols support lost packet recovery using acknowledgements. For example, a receiver of data packets may generate an acknowledgement (ACK) for one or more data packets received and transmit the acknowledgement back to the sender. If the sender determines that it has not received an acknowledgement for a data packet sent within a certain time frame, the data packet or the acknowledgement may have been lost during transmission and sender may retransmit that data packet to ensure that the recipient has received the data packet. This time frame may be measured by a timer and is known as a retransmission timeout (RTO) value. Transmission Control Protocol (TCP) is one example of such a protocol that is widely used across the internet today and uses this scheme. The RTO value is typically set by the sender and may be calculated in many different ways. Many implementations base the RTO value on a round trip time (RTT), a variance in RTT, or a combination of factors. The RTT is the time elapsed between the start of transmission of a TCP-type data segment and the receipt of an acknowledgment of that segment.

In some cases, data packets are transmitted across two or more networks or sub-networks and the two or more networks or sub-networks may have different specifications, properties, performance, and characteristics. These networks or sub-networks may include wired networks (e.g., Ethernet networks), local area networks (LANs), wide area networks (WANs), enterprise private networks (EPNs), wireless networks, cellular networks, and other such networks. Transmission speeds, congestion, responsiveness, and other metrics that may affect round trip times may vary more in certain networks than in other networks.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The disclosed technology addresses the need in the art to prevent network timeouts.

Various aspects of the disclosed technology are directed to networking equipment configured to prevent network timeouts when data packets are transmitted across one or more networks. In some acknowledgement-based network transmission protocols, a retransmission timeout (RTO) occurs when a sender transmits a data packet and does not receive an acknowledgement (ACK) back before a timer expires. The timer may be set by the sender at a RTO value, which may be calculated in several ways. For example, according to certain Transmission Control Protocol (TCP) implementations, the RTO value is a function of a mean or estimated round trip time (RTT) and a RTT variation value. If an RTO occurs, the sender may retransmit the data packet that did not receive an ACK. An RTO occurrence may indicate that the data packet or acknowledgement for the data packet was dropped during transmission.

Some networks may have more variation in transmission speed than others. For example, wireless or cellular networks may experience more congestion or collisions that intermittently affect transmission speeds a great deal. Other networks, such as a wired Ethernet network, may have more consistent speeds. Because the RTO value is often a function of the mean or estimated round trip time (RTT) and RTT variation, the difference in the variance characteristics of the networks that a data packet must pass through may cause a RTO where the data packet or ACK was not dropped, but merely that the ACK was not received by the sender before the RTO timer expired.

Retransmissions interrupt smooth data flow, slow down transmission, and add additional burden (e.g., consuming processing time, bandwidth, and other computing resources) on the network and devices involved in the transmission of data packets from the sender to the receiver. Additionally, in some implementations, an RTO event may be taken by a sender that the rate of data transmission is too high. Accordingly, the sender may dramatically cut and/or stop data transmission, which has a large impact on throughput, especially when RTO events happen frequently. Accordingly, it is desirable to limit unnecessary RTOs such as when a RTO occurs as a result of an ACK to a data packet is merely being late instead of because the data packet or ACK is dropped. Aspects of the subject technology relate to access points configured to prevent these types or RTOs by delaying an ACK from being forwarded from a receiver to a sender, which reduces the variation that the sender sees in receiving ACKs from the receiver.

DETAILED DESCRIPTION

Although various embodiments of the subject technology are compatible with different network transmission protocols, some embodiments are discussed with respect to particular protocols for illustrative purposes, but can be extended to other protocols as well.

A common cause of lost or dropped packets is a sender sending too many data packets too fast, causing congestion in the network. Accordingly, many network protocols (e.g., certain implementations of the Transmission Control Protocol (TCP)) adopt techniques such as a "slow start" technique to prevent congestion and dropped data packets.

Figure 1:
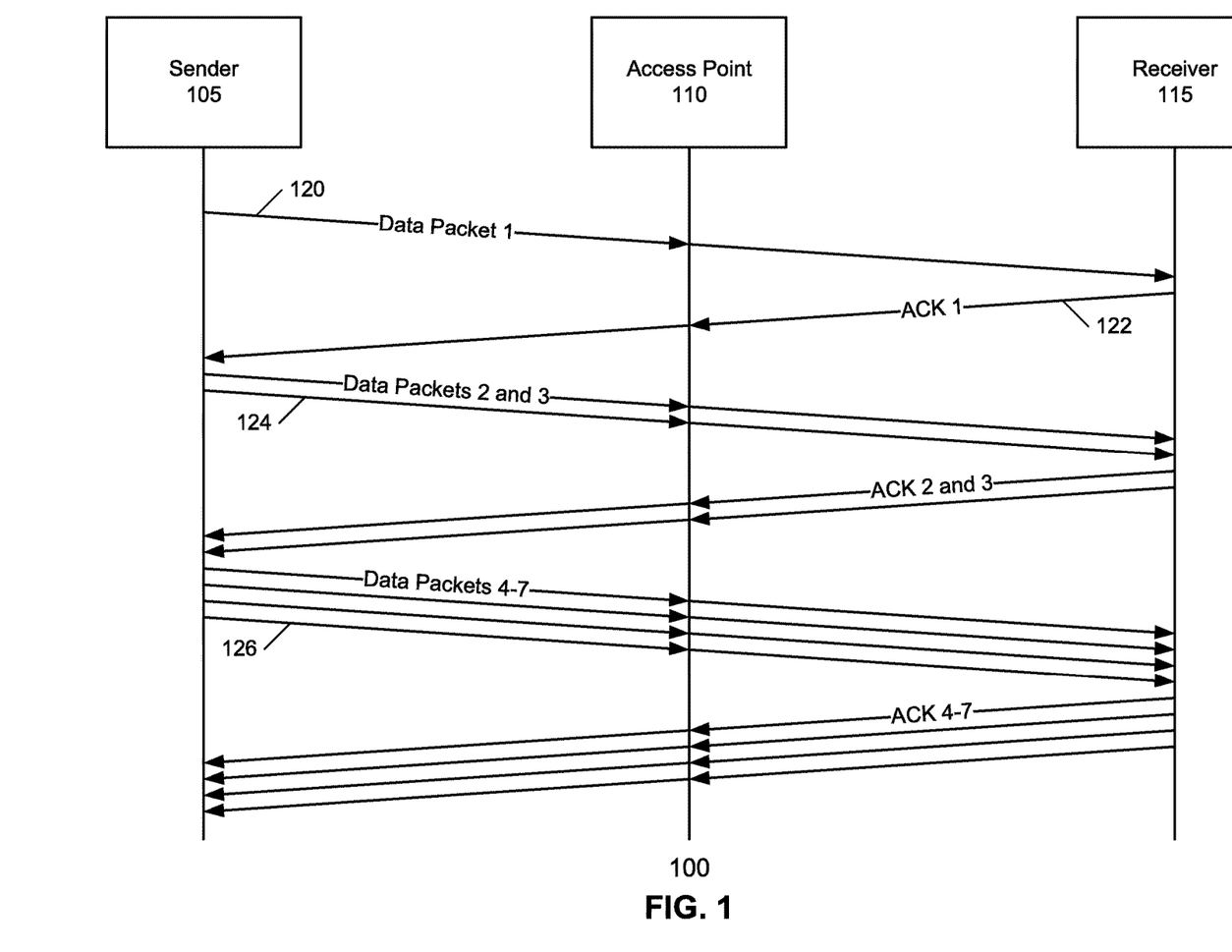
FIG. 1 is a diagram illustrating a slow start implementation, in accordance with various embodiments.

FIG. 1 is a diagram 100 illustrating a slow start implementation, in accordance with various embodiments. Other slow start implementations or congestion control techniques may also be used with the embodiments disclosed herein. The slow start is a technique implemented by a sender that is configured to avoid sending more data than the network is capable of transmitting by starting with a small amount of data and gradually increasing the amount of data being transmitted until a loss is detected or another limiting factor is reached.

In FIG. 1, a sender 105 initially begins a transmission with a congestion window size (CWND) of 1 data packet, although in other implementations other CWND sizes may be used. The sender transmits the first data packet to the receiver 115 at 120. The data packet is transmitted through a number of network entities including access point 110, which receives the data packet and forwards the data packet on to receiver 115. When the receiver 115 receives the data packet, the receiver 115 generates and acknowledgement (ACK) and transmits the ACK to the sender 105 through various network entities such as access point 110 at 122. The access point 110 then forwards the ACK to the sender 105. Although access point 110 in FIG. 1 is shown as receiving the data packet and the ACK for the data packet, in various embodiments, the access point forwarding the data packet to the receiver 115 may not be the same access point forwarding the ACK to the sender 105.

If the sender 105 receives the ACK for the first data packet, the sender may increase the value of the congestion window and send additional packets. In the implementation shown in FIG. 1, the sender increases the CWND by 1 for each ACK received, effectively doubling the CWND size each round trip. For example, at 124, the sender 105 increases the CWND to 2 and sends 2 data packets to the receiver 115. The sender 105 receives ACKs for both data packets, increases the CWND to 4, and sends 4 data packets at 126.

If the sender 105 does not receive an ACK for a data packet that is sent within a retransmission timeout (RTO) window, a retransmission timeout event occurs where it may be assumed that the data packet or the ACK for the data packet may have been lost or dropped as a result of network congestion. However, in some cases, the data packet and the ACK may not have been lost. Instead, the ACK may have been delayed in arriving at the sender 105 before the expiration of the RTO window because of some variation (e.g., a large variation) in network speed.

According to some embodiments, the sender 105 may calculate the RTO window based on a mean or estimated round trip time (RTT) and a RTT variation value. For example, the RTO window may equal the estimated RTT plus 4 times a RTT variation value. However, other implementations and calculations of the RTO window are also compatible with embodiments of the subject technology.

When an RTO event occurs, the sender 105 takes steps to reduce the load on the network. In some implementations, this means that the sender 105 resends the data packet and restarts the congestion window to 1. Many of the various ways of reducing the load on the network may dramatically slow the transmission of data from the sender 105 to the receiver 115 and come at a cost of additional time and computing resources. Accordingly, it is desirable to avoid unnecessary RTO events. Various embodiments of the subject technology are directed to preventing these types or RTO events by holding an ACK in a buffer at an access point for a period of time before forwarding the ACK to a sender in order to reduce the variation that the sender sees in receiving ACKs from the receiver. Reducing the variation that the sender sees in receiving ACKs from a receiver decreases the probability that an ACK will be received by the sender after the RTO window expires.

Figure 2:
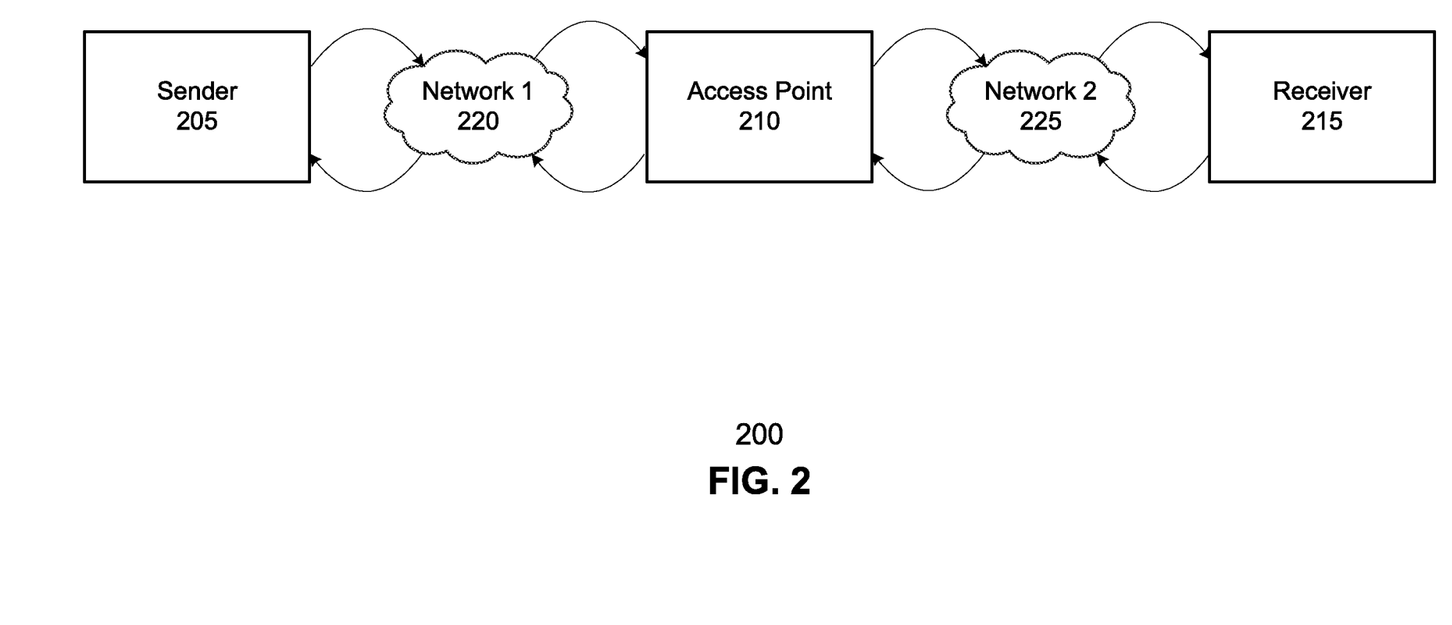
FIG. 2 is a conceptual block diagram illustrating an example network environment, in accordance with various embodiments of the subject technology.

FIG. 2 is a conceptual block diagram illustrating an example network environment 200, in accordance with various embodiments of the subject technology. In FIG. 2, a sender 205 and receiver 215 may communicate via an access point 210. Data sent between the sender 205, the access point 210, and the receiver 215 may travel through network 1 220 and network 2 225.

The sender 205 and the receiver 215 may be any computing device capable of communicating in a network and their roles may be interchangeable depending on whether one computing device is sending or receiving data packets from the other computing device. Possible computing devices may include a personal computer or laptop, a server (e.g., a TCP server), smart phones, tablets, mobile devices, smart devices, set top boxes, wearable devices, client devices, or any other device capable of transmitting or receiving data over a network.

Although various aspects of the subject technology may be discussed with respect to access point 210 forwarding a data packet from sender 205 to receiver 215 and forwarding an ACK from receiver 215 to sender 205, in other embodiments, different access points may forward data packets and ACKs and an ACK need not follow the same path as a corresponding data packet. Furthermore, access point 210 is shown between network 1 220 and network 2 225 in FIG. 2. However, in some embodiments, access point 210 may be any network hardware that resides on some path in which a data packet is sent to the receiver 215, some path in which an ACK is sent to the sender 205, or both.

Network 1 220 and network 2 225 may each be any type of network and be composed of one or more sub-networks or be considered sub-networks themselves. Network 1 220 and network 2 225 may include, for example, any one or more of a cellular network, a WiFi network, a satellite network, a personal area network (PAN), a local area network (LAN), a wide area network (WAN), a broadband network (BBN), the Internet, and the like. Further, the network 110 can include, but is not limited to, any one or more of the following network topologies, including a bus network, a star network, a ring network, a mesh network, a star-bus network, tree or hierarchical network, and the like. Network 110 can be a public network, a private network, or a combination thereof. Communication network 110 may be implemented using any number of communications links associated with one or more service providers, including one or more wired communication links, one or more wireless communication links, or any combination thereof. Additionally, network 110 can be configured to support the transmission of data formatted using any number of protocols.

In some cases, network 1 220 and network 2 225 may have different characteristics. For example, the network speed for network 1 220 may be more consistent than the network speed of network 2 225. In other words, variation in network speed may be less in network 1 220 than in network 2 225 such that in network 2 225, some data packets or ACKs may be take near an expected transmission time to be delivered while other data packets or ACKs may be take much longer than the expected transmission time.

The differing characteristics of the networks may be a result of the different composition of the networks. For example, network 1 220 may be or include a wired network such as an Ethernet network while network 2 225 may be or include a wireless network (e.g., a WiFi network, cellular network, satellite network, etc.). Certain wireless networks may experience greater variation in network speeds because of network collisions as a result of hidden nodes or other reasons. An ACK that encounters network collisions in network 2 225 may need to be resent by the receiver 215 which increases the time needed to transmit the ACK to the sender 205. In some cases, the delay may be so much more than the average time needed that the delay may cause the ACK to be received by the sender 205 after the RTO timer expires.

Various embodiments of the subject technology are directed to preventing this by decreasing the amount of variability within network 2 225. For example, the access point 210 may measure the time needed to send a data packet to the receiver 215 and receive a corresponding ACK back from the receiver 215. These times may be recorded in a log for a period of time to see how much variability there is in the response time. The access point may determine a delay or delay time period based on the log of response times. On subsequent ACKs received from the receiver 215, the access point 210 may temporarily store the ACK in a buffer until a delay time period expires. When the delay time period expires, the access point may forward the ACK to the sender 205.

By holding the ACK in a buffer at the access point 210 until the delay time period expires, the variation in round trip time seen by the sender 205 will decrease while the average round trip time may increase. However, the efficiencies caused by reducing the number of retransmission time out (RTO) events will likely outweigh any increase in average round trip time.

Figure 3:
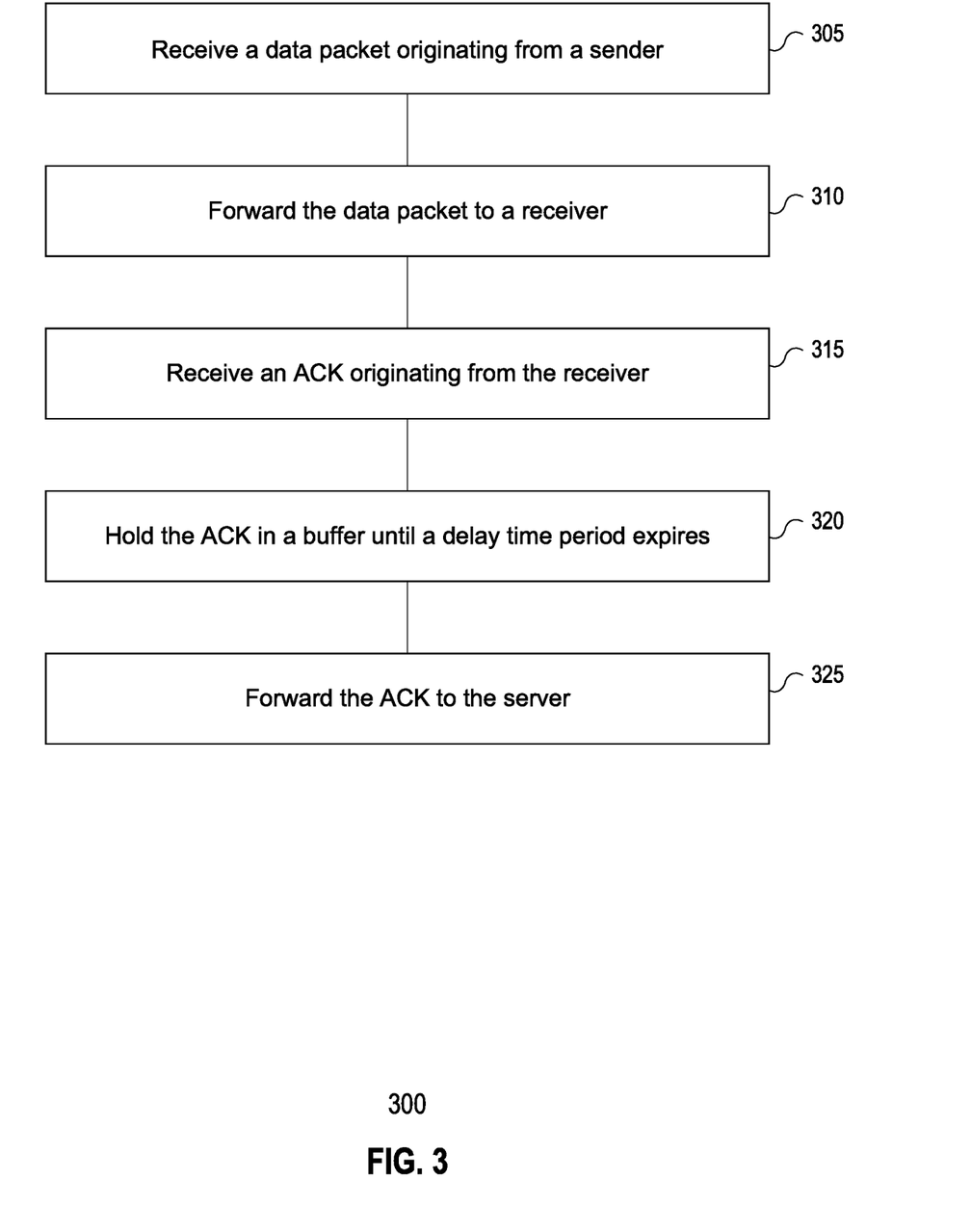
FIG. 3 shows an example method for preventing network retransmission timeout (RTO) events, in accordance with various embodiments.

FIG. 3 shows an example method 300 for preventing network retransmission timeout (RTO) events, in accordance with various embodiments of the subject technology. Although the methods and processes described herein may be shown with certain steps and operations in a particular order, additional, fewer, or alternative steps and operations performed in similar or alternative orders, or in parallel, are within the scope of various embodiments unless otherwise stated.

Method 300 may be implemented by a system which may be an access point, another network device, or a combination of network devices. At operation 305, the system may receive a data packet originating from a sender such as a TCP server. The system may forward the data packet to a receiver at operation 310. After some time, at operation 315, the system may receive an acknowledgement message (e.g., an ACK) originating from the receiver, where the acknowledgement message corresponds to the data packet sent earlier. At operation 320, the system may hold the acknowledgement message in a buffer until a delay time period expires and then forward the acknowledgement message to the server at operation 325.

The delay time period may be determined by the system or a third party and the delay time period may be determined beforehand (e.g., before operation 305) or while the method 300 is executing. For example, after the ACK is received in operation 315, the system may record in a log of acknowledgement times the amount of time that elapsed between the forwarding of the data packet at operation 310 to the receiving of the ACK for that data packet at operation 315. The system may then determine the delay time period based on the acknowledgement times in the log. The log of acknowledgement times may include acknowledgement times for prior connections with the same receiver within a recent time period, prior connections with the same receiver within a longer time period, or prior connections with different receivers.

The log may be configured to keep acknowledgement times for a specified period of time. The system may prune acknowledgment times that are older than the specified period of time so that the delay time period is current. In some cases, the specified period of time is longer than the time frame that a sender uses to determine the RTO window. Accordingly, the system may be able to take into consideration acknowledgement time variations over a longer period of time than the time period that the sender uses to calculate the RTO window.

The delay time period may be determined based on the maximum acknowledgement time recorded in the log, or a variation value calculated based on the acknowledgement times recorded in the log. Furthermore, a constant value may also be added and/or multiplied to the delay time period to further ensure that the RTO window will not expire before an ACK is received by the sender. The delay time period may further be determined based on the load of a network or sub-network between the receiver and the system, a number of access points that may be interfering with communications between the system and the receiver, or a number of clients supported in the network or sub-network between the receiver and the system, or by other means.

Figure 4:
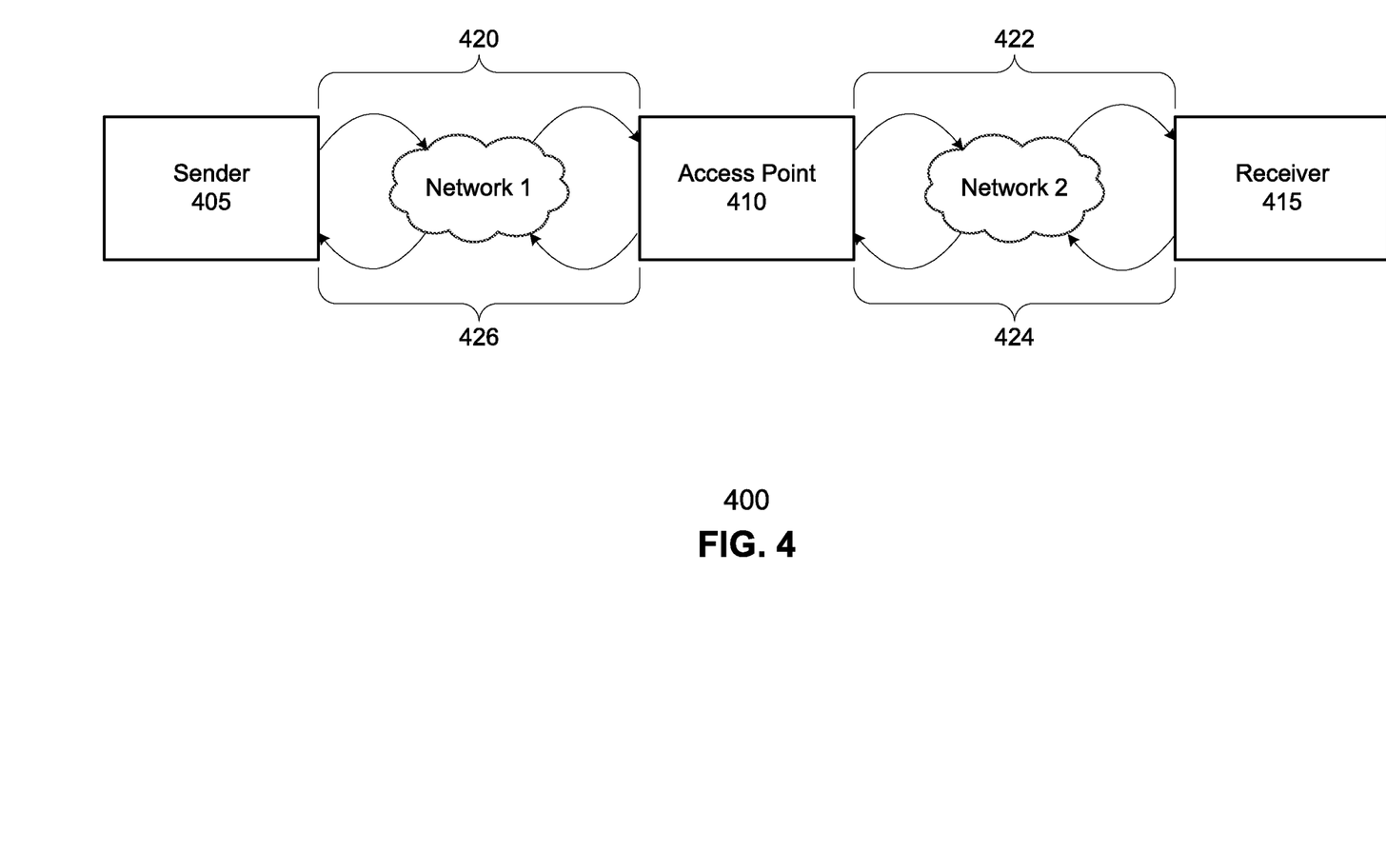
FIG. 4 is a diagram illustrating an example network environment, in accordance with various embodiments of the subject technology.

FIG. 4 is a diagram illustrating an example network environment 400, in accordance with various embodiments of the subject technology. FIG. 4 provides a scenario that helps illustrate various embodiments. In FIG. 4, the delay time period may be the maximum acknowledgement time recorded in the log plus a constant time. However, various embodiments are compatible with other ways of calculating the delay time period.

The sender 405 sends a data packet to a receiver 415. The data packet passes through network 1 at 420 and reaches access point 410. The access point receives the data packet, notes the time the data packet is received, and forwards the data packet to the receiver at 422. The receiver 415 receives the data packet, generates an ACK for the data packet, and transmits the ACK back to the sender 415. The ACK passes through network 2 at 424 and reaches access point 410. The access point 410 notes the time the data packet is received and generates a new entry in the log of acknowledgement times for the time it took the access point 410 to forward the data packet 422 until the time the access point 410 received the ACK for the data packet 424.

If the time it took the access point 410 to forward the data packet 422 until the time the access point 410 received the ACK for the data packet 424 is less than the delay time period, the access point may hold the ACK in a buffer until the remaining delay time period expires. After the delay time period expires, the access point 410 may forward the ACK to the sender 405 at 126.

For example, the log may include a number of acknowledgement times recorded by the access point 410. Assume that the maximum acknowledgement time in the log is 50 milliseconds. The access point 410 may determine that the delay time period is 50 milliseconds plus a constant value of 5 milliseconds for a total of 55 milliseconds. If an ACK is received 55 milliseconds or more after the access point 410 forwarded the data packet to the receiver, there is no remaining delay time period. Accordingly, the access point 410 may forward the ACK to the sender 405 immediately. On the other hand, if the ACK was received 2 milliseconds after the access point 410 forwarded the data packet to the receiver, the access point 410 may hold the ACK in a buffer for 53 milliseconds and then forward the ACK to the sender 405.

By adding a delay, the access point is reducing the variability of the acknowledgement time and transmission times of data moving through network 2, the network with more variability. According to some embodiments, the round trip times seen by the sender 405 also vary less and are less likely to produce an RTO event. There may be additional delay based on the time the ACK is held in the buffer, especially if, in the example described, most ACKs are received at around 2 milliseconds. However, this delay is offset by the reduction in the number of RTO events that occur.

In some cases, there is additional delay being added into the transmission times of ACKs from the receiver to the sender and these delays may build up. Various embodiments address this by only holding ACKs in the buffer if the data packets are being transmitted as part of a bulk transfer or large amount of data being transferred from the sender to the receiver. For example, the system may be configured to determine whether a bulk transfer is in progress and begin holding acknowledgement messages in a buffer if there is a bulk transfer in progress. In some embodiments, when a bulk transfer is recognized, a delay may be slowly introduced and ramped up. Additionally, when bulk transfers are not in progress, transfers may go through without delay being added. The system may determine whether a transfer of data is a bulk transfer by determining whether a sender has been transmitting to a receiver for more than a specified period of time (e.g., a bulk transfer period of time) or whether the sender has been transmitting to the receiver for more than a threshold number of round trips.

Figure 5A:
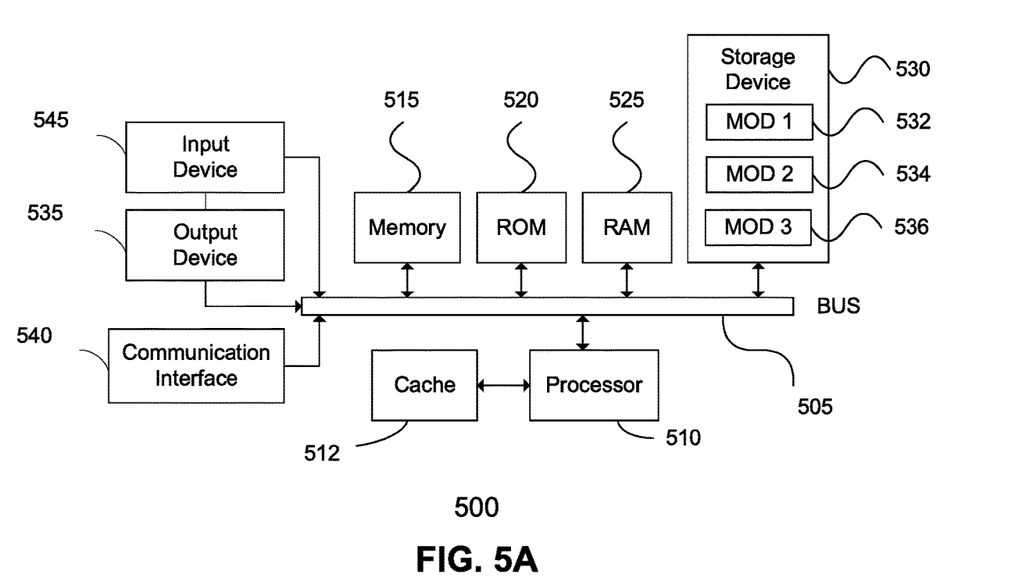
FIGS. 5A and 5B show example possible system embodiments.
Figure 5B:
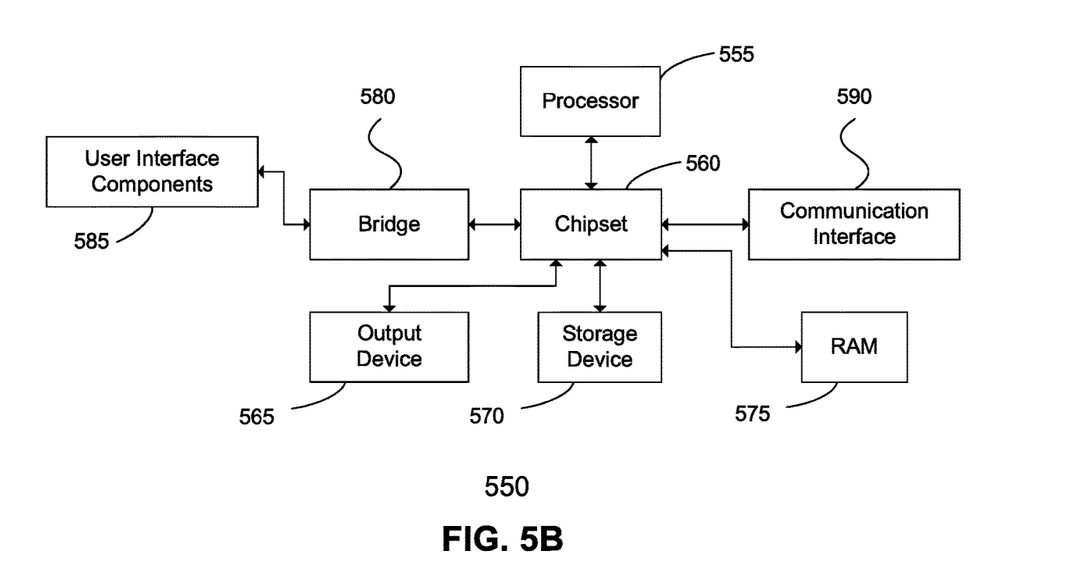

FIG. 5A, and FIG. 5B show example possible system embodiments. The more appropriate embodiment will be apparent to those of ordinary skill in the art when practicing the present technology. Persons of ordinary skill in the art will also readily appreciate that other system embodiments are possible.

FIG. 5A shows a conventional system bus computing system architecture 500 wherein the components of the system are in electrical communication with each other using a bus 505. Example system 500 includes a processing unit (CPU or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 535 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B shows a computer system 550 having a chipset architecture that can be used in executing the described method and generating and displaying a graphical user interface (GUI). Computer system 550 is an example of computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. In this example, chipset 560 outputs information to output 565, such as a display, and can read and write information to storage device 570, which can include magnetic media, and solid state media, for example. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks.

Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that example systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
receiving a data packet originating from a sender;
forwarding the data packet to a receiver;
receiving an acknowledgment message originating from the receiver, the acknowledgment message corresponding to the data packet;
recording, in a log of acknowledgment times, an amount of time elapsed between the forwarding of the data packet to the receiver and the receiving of the acknowledgement message from the receiver;
reducing acknowledgment variations seen by the sender by, when the amount of time elapsed between the forwarding of the data packet to the receiver and the receiving of the acknowledgement message from the receiver is less than a delay time period, holding the acknowledgment message in a buffer until the delay time period expires, the delay time period determined based on a maximum acknowledgment time in the log of acknowledgment times; and
forwarding the acknowledgment message to the sender.

2. The computer-implemented method of claim 1, further comprising:
determining the delay time period based on a function of the log of acknowledgement times, a constant value, and a number of access points or a number of clients.

3. The computer-implemented method of claim 1, further comprising:
identifying the maximum acknowledgment time based on the log of acknowledgement times.

4. The computer-implemented method of claim 1, wherein the delay time period is determined based on an additional constant delay.

5. The computer-implemented method of claim 1, wherein the acknowledgement message is received via a first network and the acknowledgement message is forwarded to the sender via a second network.

6. The computer-implemented method of claim 5, wherein first network is a wireless network.

7. The computer-implemented method of claim 5, wherein the log of acknowledgement times comprises a record of acknowledgement times for the first network.

8. The computer-implemented method of claim 1, wherein the sender is a TCP server and the receiver is a client device.

9. The computer-implemented method of claim 1, further comprising:
recording, in the log of acknowledgment times, a plurality of times, each of the plurality of times corresponding to a time elapsed between forwarding a corresponding one of a plurality of data packets to the receiver and receiving a corresponding one of a plurality of acknowledgement messages from the receiver; and
determining a variability between the plurality of times.

10. The computer-implemented method of claim 1, further comprising:
determining that the sender has been transmitting to the receiver for more than a bulk transfer period of time; and
wherein the acknowledgment message is held in the buffer for the delay time period in response to the determination that the sender has been transmitting to the receiver for more than the bulk transfer period of time.

11. The computer-implemented method of claim 1, further comprising:
    determining that the sender has been transmitting to the receiver for more than a threshold number of round trips of for more than a bulk transfer amount of data; and
    wherein the acknowledgment message is held in the buffer for the delay time period in response to the determination that the sender has been transmitting to the receiver for more than the threshold number of round trips.

12. A non-transitory computer-readable medium comprising instructions, the instructions, when executed by a computing system, cause the computing system to:
    record, in a log of acknowledgment times, a plurality of acknowledgement times corresponding to elapsed times between forwarding of a plurality of data packets to one or more receivers and receiving a plurality of acknowledgement messages from the one or more receivers;
    determine a delay time period based on a maximum acknowledgment time in the log of acknowledgement times;
    receive, from the one or more receivers, an acknowledgment message corresponding to a data packet received from a sender;
    reduce acknowledgment variations seen by the sender by, when an elapsed time associated with the data packet and the acknowledgment message is less than the delay time period, holding the acknowledgment message until the delay time period expires; and
    forward the acknowledgment message to the sender.

13. The non-transitory computer-readable medium of claim 12, wherein the instructions further cause the computing system to:
    receive the data packet originating from the sender; and
    forward the data packet to the one or more receivers, wherein the acknowledgment message corresponds to the data packet.

14. The non-transitory computer-readable medium of claim 12, wherein the delay time period is determined based on the maximum acknowledgment time in the log of acknowledgement times.

15. The non-transitory computer-readable medium of claim 12, wherein the acknowledgement message is received via a first network and the acknowledgement message is forwarded to the sender via a second network.

16. The non-transitory computer-readable medium of claim 12, wherein the instructions further cause the computing system to determine that the sender has been transmitting to the one or more receivers for more than a bulk transfer period of time, wherein the acknowledgment message is held in a buffer for the delay time period in response to the sender transmitting to the one or more receivers for more than the bulk transfer period of time.

17. The non-transitory computer-readable medium of claim 12, wherein the instructions further cause the computing system to determine that the sender has been transmitting to the one or more receivers for more than a threshold number of round trips, wherein the acknowledgment message is held in buffer for the delay time period in response to the sender transmitting to the one or more receivers for more than the threshold number of round trips.

18. A system comprising:
    a processor;
    a buffer; and
    a non-transitory computer-readable medium storing instructions which, when executed by the processor, cause the system to:
        receive, from a receiver, an acknowledgment message corresponding to a data packet received by the receiver and originating from a sender;
        record, in a log of acknowledgment times, an amount of time elapsed between a forwarding of the data packet to the receiver and the receiving of the acknowledgement message from the receiver;
        reduce acknowledgment variations seen by the sender by, when the amount of time is less than a delay time period, holding the acknowledgment message in the buffer until the delay time period expires, the delay time period determined based on a maximum acknowledgment time in the log of acknowledgement times; and
        forward the acknowledgment message to the sender.

19. The system of claim 18, wherein the instructions further cause the system to:
    record, in the log of acknowledgment times, a plurality of times, each of the plurality of times corresponding to a time elapsed between forwarding a corresponding one of a plurality of data packets to the receiver and receiving a corresponding one of a plurality of acknowledgement messages from the receiver; and
    determine a variability between the plurality of times.

20. The system of claim 18, wherein the instructions further cause the system to determine that a transfer from the sender to the receiver is a bulk transfer, wherein the acknowledgment message is held in the buffer for the delay time period in response to the transfer being the bulk transfer.

* * * * *